(12) United States Patent
Hoshiyama (10) Patent No.: US 10,759,056 B2
(45) Date of Patent: Sep. 1, 2020

(54) CONTROL UNIT FOR ARTICULATED ROBOT

(71) Applicant: FANUC CORPORATION, Yamanashi (JP)

(72) Inventor: Teppei Hoshiyama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 157 days.

(21) Appl. No.: 16/046,474

(22) Filed: Jul. 26, 2018

(65) Prior Publication Data

US 2019/0030721 A1 Jan. 31, 2019

(30) Foreign Application Priority Data

Jul. 31, 2017 (JP) ................................ 2017-148244

(51) Int. Cl.
*G05B 15/00* (2006.01)
*G05B 19/00* (2006.01)
*B25J 9/16* (2006.01)

(52) U.S. Cl.
CPC ........... *B25J 9/1697* (2013.01); *B25J 9/1666* (2013.01); *G05B 2219/39082* (2013.01); *G05B 2219/40201* (2013.01)

(58) Field of Classification Search
CPC ..... B25J 9/1666; B25J 9/1697; B25B 27/143; G05B 2219/39082; G05B 2219/40201
See application file for complete search history.

(56) References Cited

U.S. PATENT DOCUMENTS

| 5,056,031 A | * | 10/1991 | Nakano | B25J 9/1676 700/178 |
| 2005/0055134 A1 | * | 3/2005 | Okuda | B25J 9/1666 700/245 |
| 2009/0058342 A1 | * | 3/2009 | Nihei | B25J 9/1674 318/568.24 |

(Continued)

FOREIGN PATENT DOCUMENTS

| CN | 102189552 A | 9/2011 |
| CN | 104870147 A | 8/2015 |

(Continued)

OTHER PUBLICATIONS

Japanese Office Action dated Apr. 23, 2019, for Japanese Patent Application No. 2017148244.

(Continued)

*Primary Examiner* — Harry Y Oh
(74) *Attorney, Agent, or Firm* — Karceski IP Law, PLLC (57) ABSTRACT

A control unit for an articulated robot has a memory unit which accumulates, when a safety stop function operates by contact or proximity between the articulated robot in operation and at least one of the human and an object, information of occurrence positions in each of which the contact or the proximity occurs or information detected by a sensor which can be used to derive the occurrence positions, the contact and the adjacent are causes of the operation of the safety stop function, and a display device which displays the occurrence positions on a predetermined display based on the information of the occurrence positions or the information detected by the sensor accumulated by the memory unit.

2 Claims, 6 Drawing Sheets

(56) References Cited

U.S. PATENT DOCUMENTS

| | | | |
|---|---|---|---|
| 2011/0224826 A1* | 9/2011 | Maehara | B25J 9/1676 700/255 |
| 2014/0067121 A1 | 3/2014 | Brooks et al. | |
| 2015/0081099 A1* | 3/2015 | Komatsu | B25J 13/085 700/258 |
| 2016/0279796 A1 | 9/2016 | Naitou et al. | |
| 2017/0106541 A1* | 4/2017 | Naitou | B25J 13/085 |
| 2017/0197313 A1* | 7/2017 | Nishino | A61B 5/02055 |
| 2018/0065256 A1* | 3/2018 | Naitou | B25J 13/085 |
| 2018/0297204 A1* | 10/2018 | Krasny | B25J 9/1676 |

FOREIGN PATENT DOCUMENTS

| | | |
|---|---|---|
| CN | 105983967 A | 10/2016 |
| EP | 0268317 A2 | 5/1988 |
| EP | 1516704 A2 | 3/2005 |
| EP | 2030741 A2 | 3/2009 |
| EP | 2366504 A2 | 9/2011 |
| GB | 2196763 A | 5/1988 |
| GB | 2227106 A | 7/1990 |
| JP | S6243706 A | 2/1987 |
| JP | S63158620 A | 7/1988 |
| JP | H02205495 A | 8/1990 |
| JP | H02224004 A | 9/1990 |
| JP | H09081228 | 3/1997 |
| JP | 2003071778 A | 3/2003 |
| JP | 2003136466 A | 5/2003 |
| JP | 2004160588 A | 6/2004 |
| JP | 2004243427 A | 9/2004 |
| JP | 2005081445 A | 3/2005 |
| JP | 2005219138 | 8/2005 |
| JP | 2006043792 A | 2/2006 |
| JP | 2007272309 A | 10/2007 |
| JP | 2009050958 | 3/2009 |
| JP | 2010094794 A | 4/2010 |
| JP | 2010120139 | 6/2010 |
| JP | 2010205215 A | 9/2010 |
| JP | 2014213399 A | 11/2014 |
| JP | 2017074660 | 4/2017 |
| JP | 2017100207 A | 6/2017 |
| JP | 2018039086 A | 3/2018 |
| KR | 20100117931 A | 11/2010 |
| WO | 2014036549 A2 | 3/2014 |

OTHER PUBLICATIONS

Japanese Search Report from Registered Searching Authority provided with Japanese Office Action dated Apr. 23, 2019, for Japanese Patent Application No. 2017148244.

Japanese Office Action dated Aug. 20, 2019, for Japanese Patent Application No. 2017-148244.

Chinese Office Action dated May 19, 2020, for Chinese Patent Application No. 201810831433.X.

* cited by examiner

CONTROL UNIT FOR ARTICULATED ROBOT

CROSS-REFERENCE TO RELATED APPLICATIONS

This application is based on and claims priority to Japanese Patent Application No. 2017-148244, filed on Jul. 31, 2017, the entire content of which is incorporated herein by reference.

FIELD OF THE INVENTION

The present invention relates to a control unit for an articulated robot.

BACKGROUND OF THE INVENTION

As a control unit for an articulated robot placed in a safety fence, a control unit which stops a robot when a door of a safety fence is in an open state, and then which stores the stop position and stop posture of the robot in a memory so that the articulated robot control unit can use, when resuming the operation, the stored stop position and the stop posture as the position and the posture of the robot is known. (See Japanese Unexamined Patent Application, Publication No. 2005-219138, for example.)

On the other hand, an articulated robot which can be operable under a situation in which a human exists in a vicinity of the articulated robot without using a safety fence (such as a robot which can work together with human) has come to be used for a variety of ways. (See Japanese Unexamined Patent Application, Publication No. 2017-074660, for example.) Such a robot control unit has a function of preventing objects from being caught by robot joints, a speed limit function, and a function of suspending robot operations when a sensor detects unsafe situations (safety stop function) so that the robot can operate under a situation in which a human exists in a vicinity of the robot.

SUMMARY OF THE INVENTION

A first aspect of the present invention is a control unit for an articulated robot which operates in an area where a human can exist, and the control unit for the articulated robot includes a memory unit which accumulates, when a safety stop function operates by contact or proximity between the articulated robot in operation and at least one of the human and an object, information of occurrence positions in each of which the contact or the proximity occurs or information detected by a sensor which can be used to derive the occurrence positions, the contact and the adjacent are causes of the operation of the safety stop function; and a controller which makes a display device display the occurrence positions based on the information of the occurrence positions or the information detected by the sensor accumulated by the memory unit.

Also, a second aspect of the present invention is the control unit for the articulated robot operating in an area where a human can exist, and the control unit for the articulated robot includes a controller which operates the articulated robot in accordance with an operation program; and a memory unit which accumulates, when a safety stop function operates by contact or proximity between the articulated robot in operation and at least one of the human and an object, information of occurrence positions in each of which the contact or the proximity occurs or information detected by a sensor which can be used to derive the occurrence positions, the contact and the adjacent are causes of the operation of the safety stop function; wherein the controller modifies or newly makes the operation program so that the articulated robot avoids a region where concentration degree of the occurrence positions exceeds a predetermined reference value, based on the information of the occurrence positions or the information detected by the sensor accumulated by the memory unit.

DESCRIPTION OF EMBODIMENT(S) OF THE INVENTION

A control unit 20 for an articulated robot according to an embodiment of the present invention will be described below with reference to the accompanying drawings.

Figure 1:
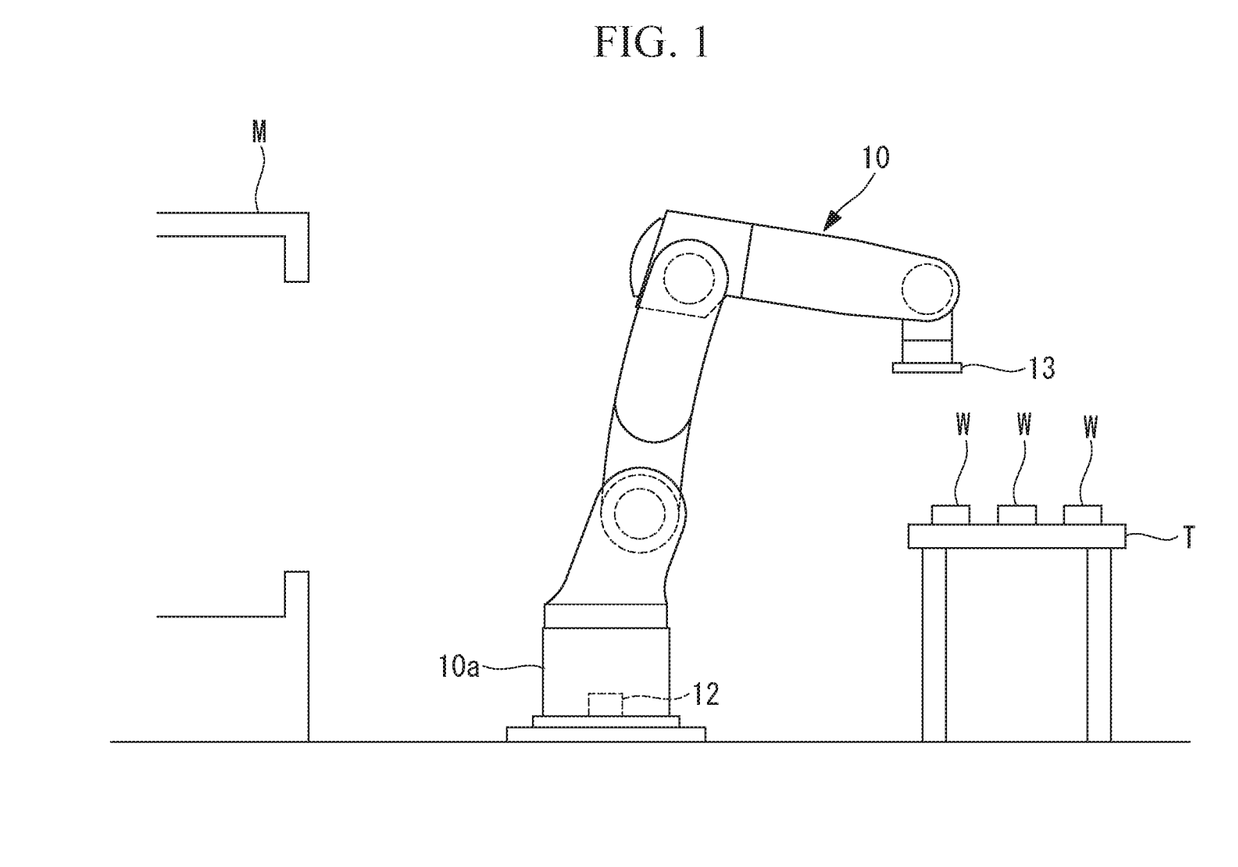
FIG. 1 is a schematic view illustrating a robot controlled by a controlled unit according to a first embodiment of the present invention.

This control unit (operation control means) 20 controls an articulated robot 10 which operates in an area where humans can exist in a vicinity thereof, as shown in FIG. 1, for example. The robot 10 includes a plurality of arm members and joints, and also includes a plurality of servomotors 11 which respectively drive the plurality of joints (refer to FIG. 2). As the servomotors 11, every kind of servomotor such as a rotary motor, a linear motor, and the like can be used. Each of the servomotors 11 has a built-in operation position detection device such as an encoder for detecting an operation position of the servomotor 11, and detected values of the operation position detection device are sent to the control unit 20.

Figure 2:
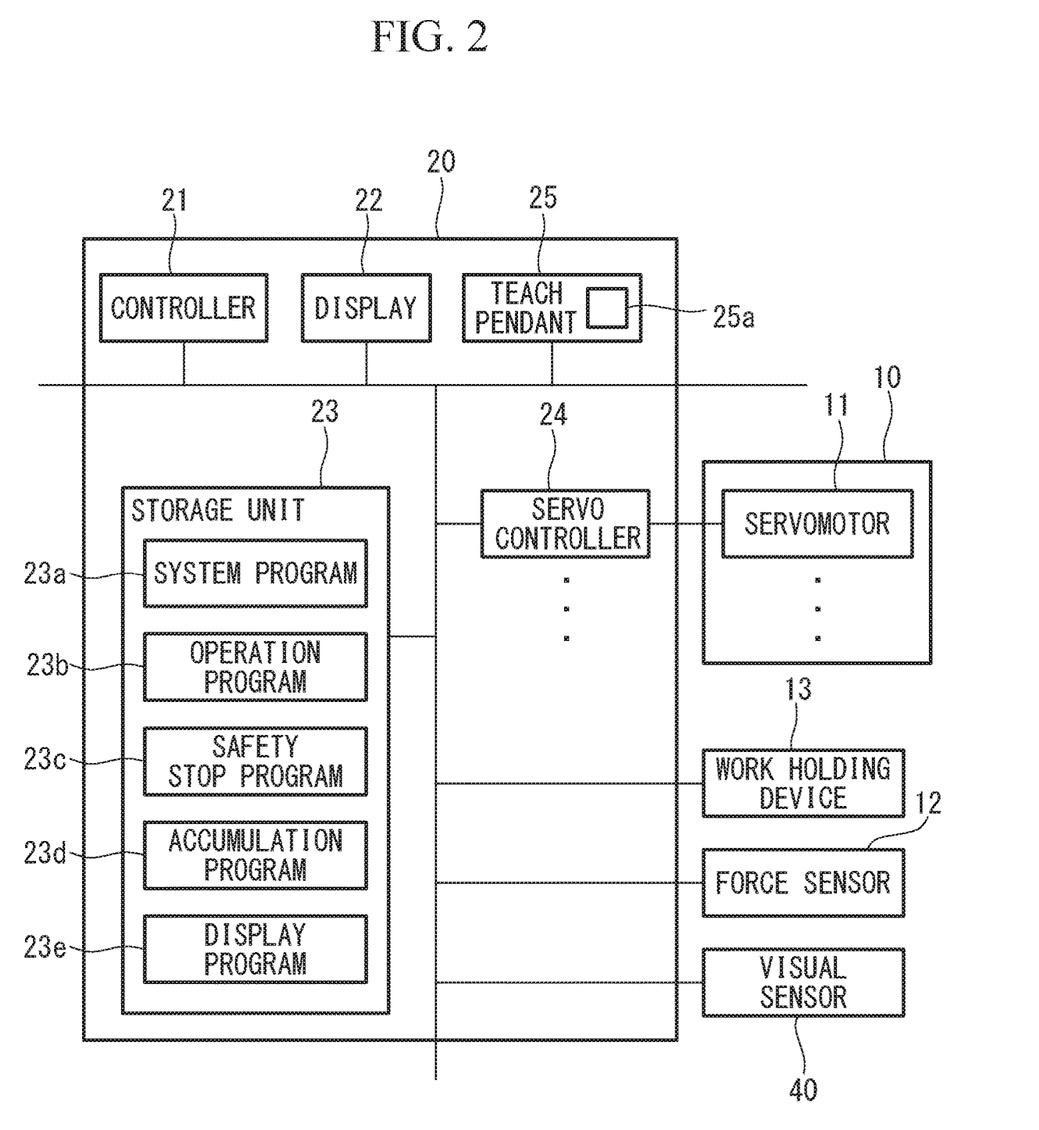
FIG. 2 is a block diagram of the control unit and a part of the robot according to the first embodiment.

A base 10a of the robot 10, for example, is provided with a force sensor 12 which has a six-axis force sensor, and detected results of the force sensor 12 are also sent to the control unit 20 (refer to FIG. 2).

The robot 10 conveys works W, which are placed on a table T, to a predetermined device M such as a processing machine by means of a work holding device 13, and the work holding device 13 which is capable of holding the work W is provided on a distal end of the robot 10. As the work holding device 13, it may be possible to use a work holding device which has an electromagnet or a suction device for attracting the work W, or a work holding device which has claws for holding the work W. The work holding device 13 is controlled by the control unit 20.

As shown in FIG. 2, the control unit 20 includes a controller 21 having, for example, CPU, RAM, and the like, a display 22, a storage unit 23 having a non-volatile storage, ROM, and the like, a plurality of servo controllers 24 which are provided so as to correspond to the servomotors 11 of the robot 10, and a teach pendant 25 which is connected to the control unit 20 and which is portable by an operator. It may be possible to configure the teach pendant 25 so that it can conduct wireless communication with the control unit 20.

A system program 23a is stored in the storage unit 23, and the system program 23a provides a basic function of the control unit 20. Also, at least one operation program 23b which is created by using the teach pendant 25 is stored in the storage unit 23. Further, the storage unit 23 stores a safety stop program 23c which controls a safety stop function for suspending operations of the robot 10 in accordance with the detected results of the force sensor 12 for safety, an accumulation program (information accumulation means) 23d which accumulates occurrence positions where causes of the safety stop have occurred, and a display program (display means) 23e which displays the accumulated occurrence positions.

The controller 21 is operated by the system program 23a, reads the operation program 23b which is stored in the storage unit 23 to temporarily store it in a RAM, and sends control signals to the servo controllers 24 according to the read operation program 23b, which controls the servo amplifiers of the servomotors 11 of the robot 10 and also controls attraction and non-attraction of the work W by the work holding device 13.

At this time, the controller 21 reads the safety stop program 23c which is stored in the storage unit 23 to temporarily store it in a RAM, and monitors the detected results of the force sensor 12 according to the read safety stop program 23c. When the detected result of the force sensor 12 exceeds a predetermined reference range, the controller 21 determines that a target to be protected, which is a human or an object, has contacted with the robot 10, and therefore, the controller 21 suspends operations of the servomotors 11 of the robot 10 (safety stop function).

Here, the controller 21 appropriately changes the predetermined reference range in consideration of whether the robot 10 holds the work W, the position of the distal end portion of the robot 10, the posture of the robot 10, the operation speed of the robot 10, the weight of each of the arm members which compose the robot 10, the inertial mass of each arm member, the weight of each of the servomotors 11, and the inertial mass of each servomotor 11.

Further, the controller 21 reads the accumulation program 23d which is stored in the memory unit 23 to temporarily store it in a RAM and run it. When at least one of the human and the object has contacted with the robot 10 and the safety stop function is operated, information about an occurrence position where the contact, which is the cause of the safety stop, occurred is accumulated in the storage unit 23.

Here, the force sensor 12 has a six-axis force sensor, therefore, the controller 21 is capable of identifying the arm portion to which the contact occurred and a position of the arm portion where the contact occurred, based on posture of the robot 10 and the detected result of the force sensor 12. That is to say, it is possible to identify the occurrence positions of the contacts as coordinate information in a three-dimensional coordinate system whose origin is located in the force sensor 12. It may be possible to configure the force sensor 12 itself so that it can identify coordinates of the occurrence positions of the contacts in the three-dimensional coordinate system, and to configure the controller 21 so that it can receive information of the coordinates of the occurrence positions of the contacts in the three-dimensional coordinate system from the force sensor 12.

The controller 21 reads the display program 23e which is stored in the storage unit 23 to temporarily store it in a RAM and run it, and the controller 21 displays the occurrence positions of the contacts, which are accumulated as described above, on the display 22 or the display 25a provided on the teach pendant 25. For example, the three-dimensional coordinate system is drawn on the display 25a of the teach pendant 25, and a rough sketch of the shape of the robot 10 and a range that the robot 10 will move according to the current operation program 23b are drawn in the three-dimensional coordinate system, and the accumulated occurrence positions of the contacts are plotted. By this, it is possible for a person who looks at this display to easily recognize the positions where the contacts frequently occurred.

Moreover, the controller 21 is operated by the display program 23e, for example, the controller 21 may set first radius spheres 31 whose centers are the occurrence positions and second radius spheres 32 whose centers are the occurrence positions, for each of the occurrence positions. In this case, as shown in FIG. 3, the display program 23e draws the first radius spheres 31 and the second radius spheres 32 in the three-dimensional coordinate system of the display 25a of the teach pendant 25.

In addition, in this three-dimensional coordinate system, it is configured that a space where the first radius sphere 31 or the second radius sphere 32 exists is set to be a region of Score 1, a space where the sphere 31 and the sphere 32 overlap with each other is set to be a region of Score 2, a space where three of the spheres 31 and spheres 32 overlap with each other is set to be a region of Score 3, and a space where more than four of the spheres 31 and the spheres 32 overlap with each other is set to be a region of Score 4.

Figure 3:
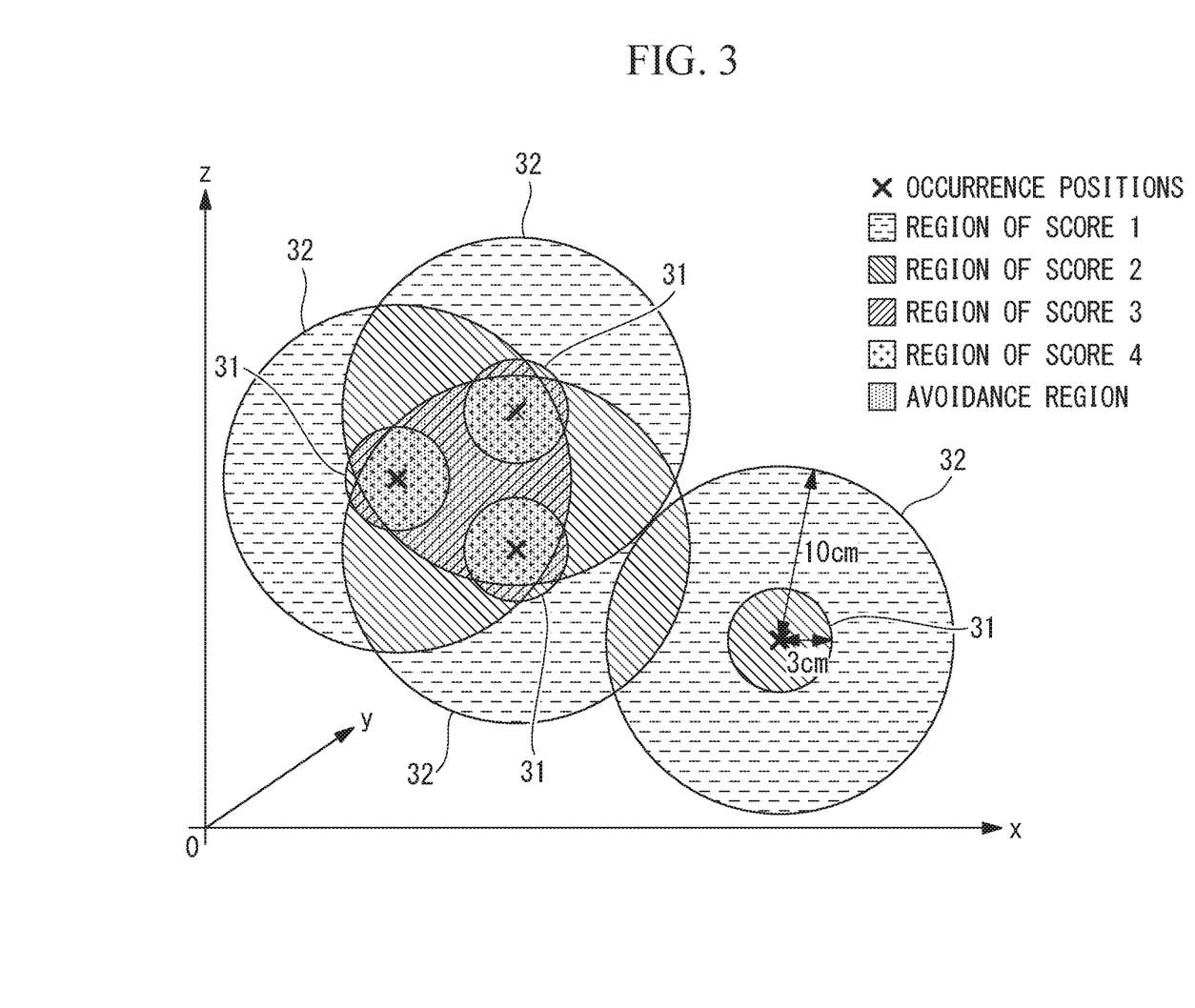
FIG. 3 is a diagram illustrating a displayed example on a display according to the first embodiment

And, as shown in FIG. 3, different colors are assigned to the region of the Score 1, the region of the Score 2, the region of the Score 3, and the region of the Score 4, respectively, and the regions are displayed in the three-dimensional coordinate system. Since different colors are assigned to the respective scores, it is possible to achieve the operations of the robot 10 with reduced number of safety stops by modifying or newly making the operation program 23b so as to avoid the region of Score 4, for example.

Also, it may be possible to configure that the controller 21 is operated based on the display program 23e so that an avoidance area is set in this three-dimensional coordinate system in accordance with a score value input by the teach pendant 25, and the avoidance area is indicated in this three-dimensional coordinate system. For example, when Score 3 is input in the teach pendant 25, the regions whose score is the same as or higher than Score 3 are set to be the avoidance area. In this case, it is possible to modify or newly create the operation program 23b more easily.

In this embodiment, the accumulated occurrence positions are displayed on the display 25a of the teach pendant 25 and the like, therefore, distributions of the occurrence positions of the contacts, which are the causes of the safety stop, can be known by looking at the display 25a, and for example, regions where the occurrence positions are concentrated, that is to say, regions which should be avoided while the robot 10 is operated can be recognized by using the distributions. By this, it is possible to easily re-teach the robot 10 so as to avoid positions where the safety stop occurs frequently.

Also, this embodiment shows the controller 21 which suspends the operations of the servomotors 11 of the robot 10 for safety in accordance with the detected results of the force sensor 12 provided on the base portion 10a of the robot 10. On the contrary, it may be possible to configure that a torque sensor is provided in each of the joints of the robot 10 so that the controller 21 suspends the operations of the servomotors 11 of the robot 10 for safety in accordance with detected results of the torque sensors.

In addition, it may be possible to configure the robot so that a pressure distribution sensor is mounted on a surface of the arm members, which may possibly have contact with a human or an object, among the plurality of arm members of the robot 10 so that the controller 21 suspends the operations of the servomotors 11 of the robot 10 for safety in accordance with detected results of the pressure distribution sensor.

Also, it is also possible to identify the occurrence positions of the contacts by using the detected results of the torque sensors or the detected results of the pressure distribution sensors.

Moreover, instead of showing the occurrence positions of the contacts, the first radius spheres 31, and the second radius spheres 32 in the three-dimensional coordinate system, it may possible to configure that value information on these coordinates is displayed on the display 25*a*.

A control unit 20 for a robot according to a second embodiment of the present invention will be described below with reference to the accompanying drawings.

Figure 4:
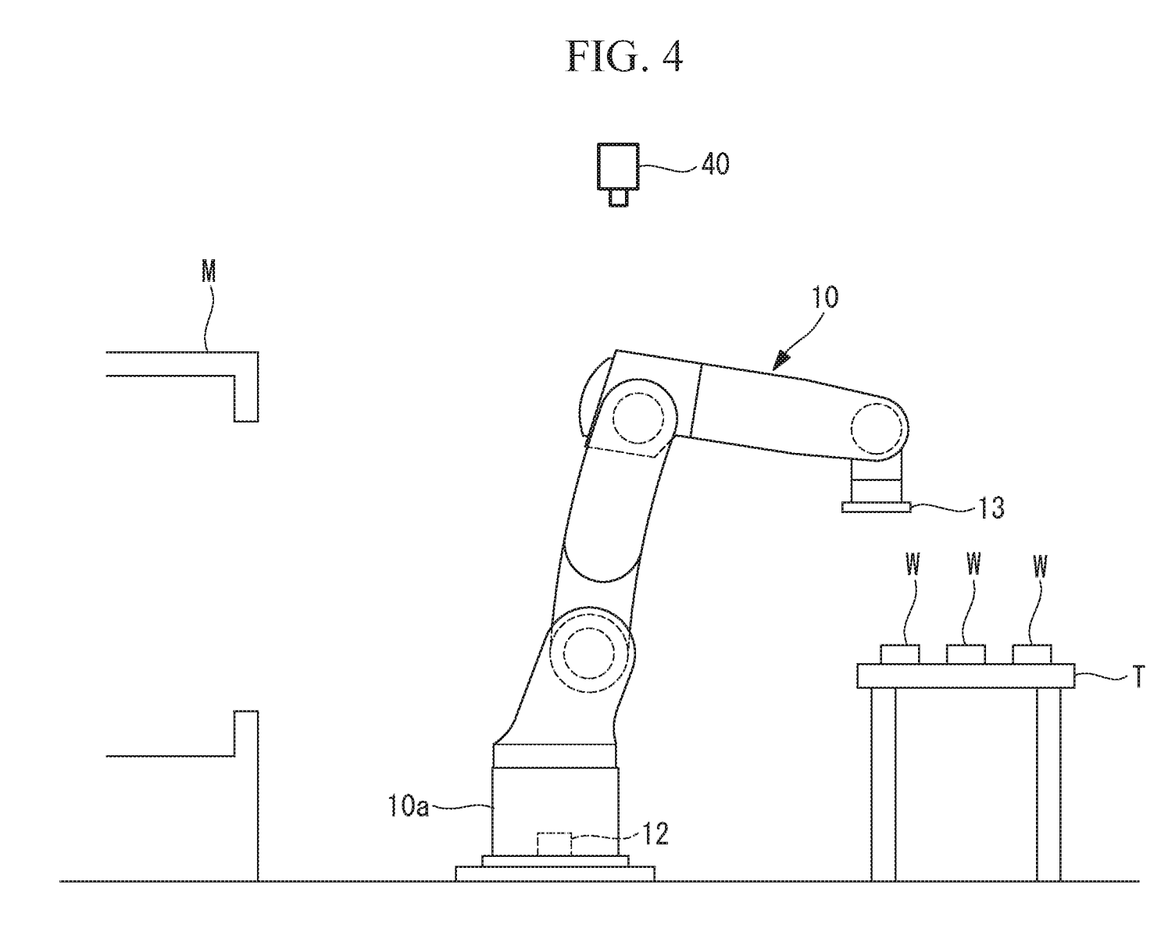
FIG. 4 is a schematic view illustrating a robot controlled by a control unit according to a second embodiment of the present invention

In the second embodiment, a visual sensor 40 is used for accumulating the occurrence positions of the contacts occurred between the robot 10 and a human or an object, instead of using the detected results of the force sensor 12 to accumulate the occurrence positions of the contacts. The other configurations are identical or similar to those in the first embodiment, so the same or corresponding parts are accompanied with the same reference numerals and the explanations thereof are omitted.

In the second embodiment, as shown in FIG. 4, the visual sensor 40 for capturing images of the robot 10 and its operational range is provided. The visual sensor 40 is connected to the control unit 20, as shown in FIG. 2. In this case, the controller 21 is operated by the safety stop program 23*c*, known image processing is conducted to the images captured by the visual sensor 40, and the operations of the servomotors 11 of the robot 10 are suspended for safety when a distance between the robot 10 and a human or an object shown in the processed image becomes shorter than a predetermined value (proximate to each other). Further, the visual sensor 40 may be a three-dimensional visual sensor, and in this case, the three-dimensional visual sensor is able to grasp a distance between the robot 10 and a human or an object in the up-and-down direction.

In addition, the controller 21 is operated by the accumulation program 23*d*, and the distance between the robot 10 and a human or an object in the processed image becomes shorter than the predetermined value (adjacent state to each other), the occurrence position of the proximity is identified as coordinate information in a three-dimensional coordinate system whose origin is located at a predetermined position of the base portion 10*a*. The occurrence position of the proximity may be a position located on the arm portion of the robot 10, a position located on a human or an object approaching to the robot 10, or a position located between the arm portion of the robot 10 and the human or the object. As for the visual sensor 40, although it is possible to identify the occurrence positions of the proximities more accurately when the sensor is the three-dimensional visual sensor, it is also possible to identify or estimate the occurrence positions of the proximities by the above described method even when the visual sensor 40 is a two-dimensional visual sensor.

And, the controller 21 is operated by the display program 23*e*, and displays the accumulated occurrence positions of the proximities, which are accumulated as described above, on the display 22 or the display 25*a* provided on the teach pendant 25. Subsequent processing is similar to those in the case of identifying the occurrence positions of the contacts.

With the second embodiment also, distributions of the occurrence positions of the proximities, which are the cause of the safety stop, can be known by looking at the display 25*a*, and for example, regions where the occurrence positions are concentrated, that is to say, regions which should be avoided while the robot 10 is operating can be recognized by using the distributions. By this, it is possible to easily re-teach the robot 10 so as to avoid positions where the safety stop occurs frequently.

A control unit 20 for a robot according to a third embodiment of the present invention will be described below with reference to the accompanying drawings.

Figure 5:
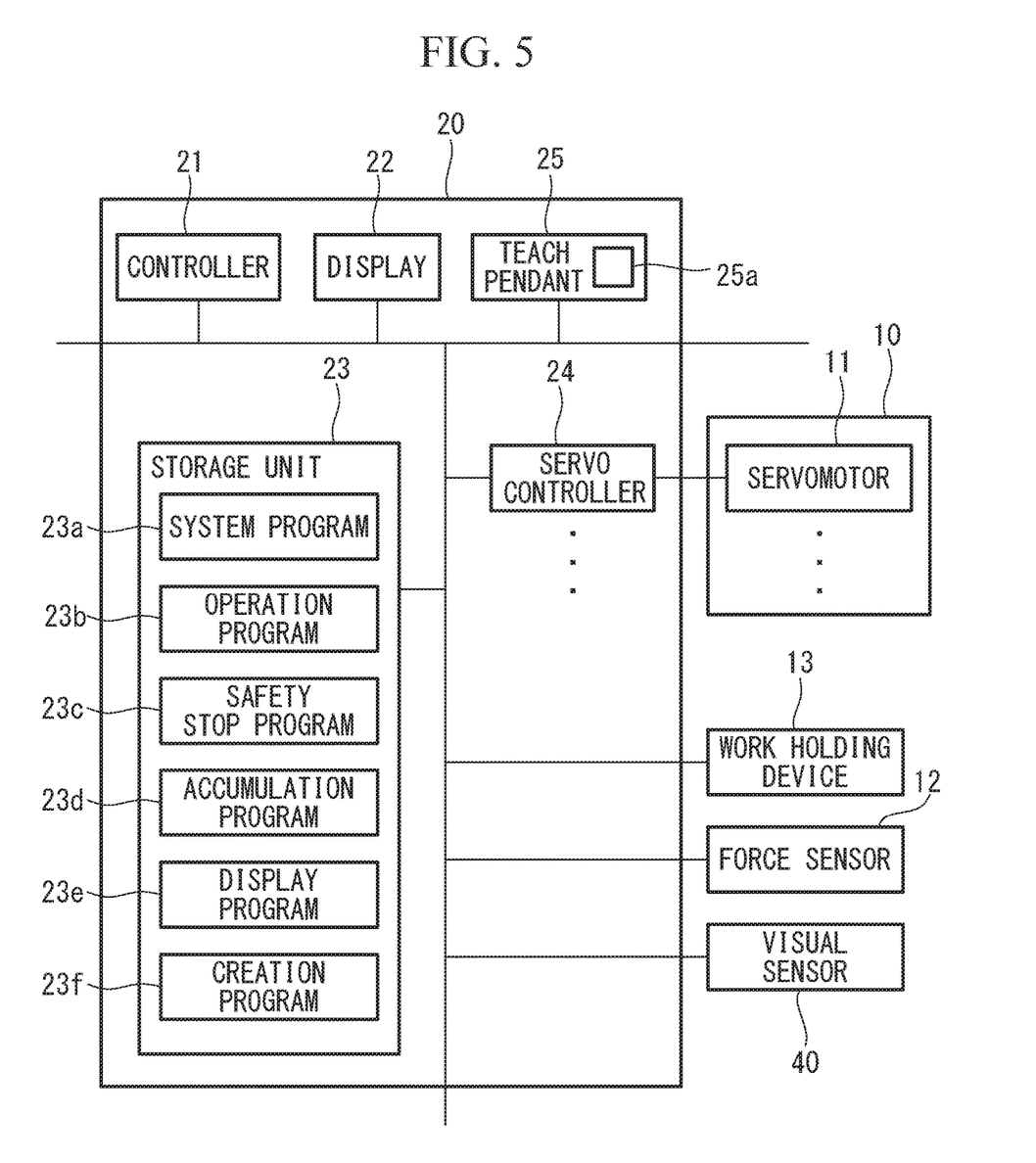
FIG. 5 is a block diagram of the control unit and a part of the robot according to a third embodiment.

In the third embodiment, it is configured that the operation program 23*b* is modified or newly created so as to avoid regions where the occurrence positions of the contacts or the proximities are concentrated, instead of displaying the occurrence positions of the contacts or the proximities, the first and second radius spheres 31, 32, and the regions of Scores 1 to 4 on the displays 22, 25*a*. Since the other configurations are identical or similar to those in the first and second embodiment, the same or corresponding parts are accompanied with the same reference numerals and the explanations thereof are omitted.

In the third embodiment, as shown in FIG. 5, a creation program (operation program making means) 23*f* for modifying or newly making the operation program 23*b* is stored to the storage unit 23.

Similar to the first and the second embodiment, when the occurrence positions of the contacts or the proximities are accumulated in the storage unit 23, the controller 21 is operated by the creation program 23*f*, and modifies or newly creates the operation program 23*b* so as to avoid the regions where the occurrence positions are concentrated beyond a predetermined reference value.

For example, similar to the first and the second embodiment, the first and the second radius spheres 31, 32 are set for each of the occurrence positions, and regions of Scores 1 to 4 created by the first and the second radius spheres 31, 32 are also set for the occurrence positions. When it is determined that the regions whose score is the same as or higher than Score 3 are the regions where the occurrence positions are concentrated beyond the predetermined reference value, and the operation program 23*b* is modified or newly created so as to avoid such regions. It is possible that a region having a group of occurrence positions, whose distance among each other is shorter than a predetermined reference value, may be the region where the occurrence positions are concentrated beyond the predetermined reference value.

In the third embodiment, the operation program 23*b* is modified or newly created so as to avoid the regions where the occurrence positions are concentrated beyond the predetermined reference value in accordance with the accumulated information about the occurrence positions. Like this, since the control unit 20 is capable of recognizing the distributions of the occurrence positions of the contacts or the proximities, which are the causes of the safety stop, in accordance with the accumulated information about the occurrence positions, it is possible to easily re-teach the robot 10 so as to avoid the positions where the safety stop occurs frequently.

Further, in the first to the third embodiments, it is configured that the occurrence positions of the contacts, which are the causes of the safety stop, are identified, and information about the identified occurrence positions of the contacts are accumulated in the storage unit 23. On the contrary, detected information (sensor detected information) of an angle sensor provided on each of the joints of the robot 10, and detected information (sensor detected information) of the visual sensor 40, which is the two-dimensional visual sensor, may also be accumulated in the storage unit 23 when the safety stop function is operated. Instead of the detected information of the angle sensors, detected information of an operation position detection device, which is built-in in each of the servomotors 11, may be accumulated.

It is possible to uniquely derive the posture of the robot 10 according to the detected information of the angle sensor provided on each of the joints of the robot 10. That is to say, it is possible to uniquely derive the height position and the posture of each of the arm members. Since the occurrence positions of the contacts or the proximities can be derived by using the detected information of the angle sensors and the detected information of the visual sensor 40, which are accumulated in the storage unit 23, it is possible to have the same effect as those of the first to the third embodiment.

Also, when the robot 10 is a multi-axis robot, with less than 6-axis, it is configured that a coordinate information (sensor detected information) of a predetermined position at the distal end of the robot 10 and posture information (sensor detected information) of the distal end of the robot 10 are detected by using a plurality of visual sensors, and when the safety stop function is operated, the coordinate information on the predetermined position of the distal end of the robot 10, the posture information on the distal end of the robot 10, and the detected information of the force sensors and the visual sensors (sensor detected information) for detecting the contacts and the proximities may also be accumulated in the storage unit 23. When using these sensor detected information, the occurrence positions of the contacts and the proximities can also be derived, which is capable of having the same effect as those of the first to the third embodiment.

Figure 6:
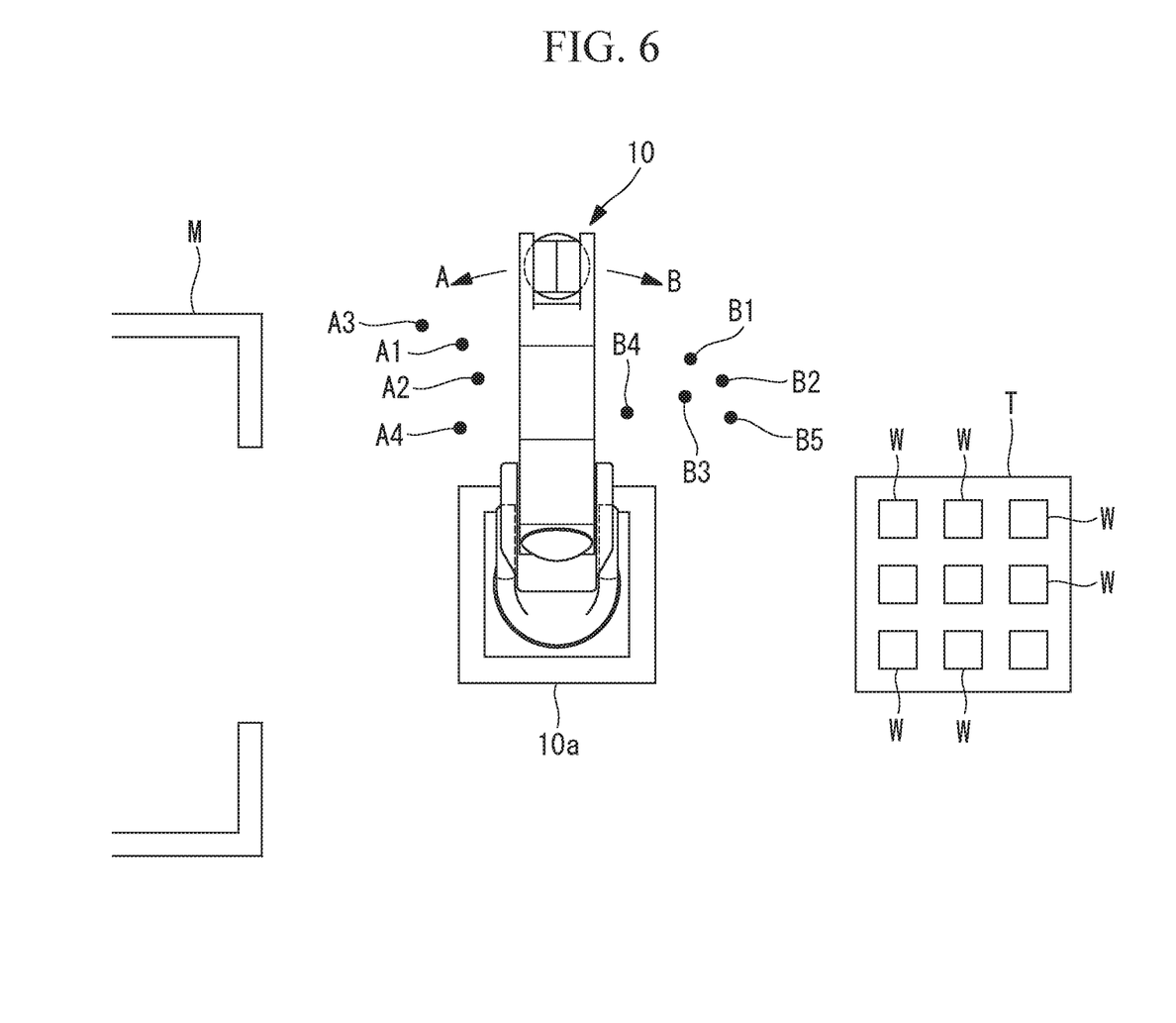
FIG. 6 is an example diagram illustrating occurrence positions according to a modified example of the first to third embodiments.

As shown in FIG. 6, in the first to the third embodiments, sensor detected information, which is capable of deriving information about the occurrence positions of the contacts or the proximities, or the occurrence positions thereof, can be assigned to different groups and accumulated in the storage unit 23 in accordance with a direction to which the robot 10 is moving when the safety stop is operated. For example, as shown in FIG. 6, occurrence positions A1 to A4, which represent contacts occurred when the robot 10 was moving toward a direction A, are assigned to Group A and accumulated in the storage unit 23, and the occurrence positions B1 to B5, which represent contacts occurred when the robot 10 was moving toward a direction B, are assigned to Group B and accumulated in the storage unit 23.

In this case, the controller 21 is operated by the display program 23e, and is capable of displaying the occurrence positions in an identifiable manner to which group the occurrence position belongs between Group A and B on the display 25a, and the like, and is also capable of displaying the occurrence positions per group on the display 25a, and the like.

Also, the controller 21 is operated by the creation program 23f, the operation program 23b is modified or newly created so as to avoid regions where the occurrence positions A1 to A4 are concentrated when moving the robot 10 to the direction A, and the operation program 23b is modified or newly created so as to avoid regions where the occurrence positions B1 to B5 are concentrated when moving the robot 10 to the direction B.

Moreover, in the present embodiment, the robot 10 is for conveying the work W, however, the robot 10 may be used such as for processing and assembling the work W, and it also may be used for processing other items. For example, in such a case that a laser processing tool may be attached to the distal end of the robot 10 so that the robot 10 conducts laser processing, the controller 21 displays the distributions of the occurrence positions of the contacts, or modifies or newly creates the operation program in accordance with the distributions of the occurrence positions of the contacts when an object has been contacted with another object frequently and the safety stop function is operated.

The following aspects of the present invention are derived from the aforementioned disclosure.

A first aspect of the present invention is a control unit for an articulated robot which operates in an area where a human can exist, and the control unit for the articulated robot includes an information accumulation means which accumulates, when a safety stop function operates by contact or proximity between the articulated robot in operation and at least one of the human and an object, information of occurrence positions in each of which the contact or the proximity occurs or information detected by a sensor which can be used to derive the occurrence positions, the contact and the adjacent are causes of the operation of the safety stop function; and a display means for displaying the occurrence positions on a predetermined display based on the information of the occurrence positions or the information detected by the sensor accumulated by the information accumulation means.

With this aspect, in accordance with the information about the occurrence positions accumulated in the information accumulation means, the accumulated occurrence positions are displayed on the display, or the occurrence positions derived from the information detected by the sensor and accumulated in the information accumulation means are displayed on the display. And therefore, distributions of the occurrence positions of the contacts or the proximities, which are the causes of the safety stop, can be known by looking at the display, and for example, regions where the occurrence positions are concentrated, that is to say, regions which should be avoided while the articulated robot is operating can be recognized by using the distributions.

Also, a second aspect of the present invention is the control unit for the articulated robot operating in an area where a human can exist, and the control unit for the articulated robot includes an operation control means which operates the articulated robot in accordance with an operation program; an information accumulation means which accumulates, when a safety stop function operates by contact or proximity between the articulated robot in operation and at least one of the human and an object, information of occurrence positions in each of which the contact or the proximity occurs or information detected by a sensor which can be used to derive the occurrence positions, the contact and the adjacent are causes of the operation of the safety stop function; and an operation program making means which modifies or newly makes the operation program so that the articulated robot avoids a region where concentration degree of the occurrence positions exceeds a predetermined reference value, based on the information of the occurrence positions or the information detected by the sensor accumulated by the information accumulation means.

With this aspect, the operation program is modified or newly created so as to avoid regions where the occurrence positions are concentrated beyond the predetermined reference value, based on the information about the occurrence positions or the information detected by the sensor accumulated by the information accumulation means. As described above, the controller recognizes distributions of the occurrence positions of the contacts or the proximities, which are the causes of the safety stop, based on the information accumulated in the information accumulation means, and therefore, it is possible to easily re-teach the articulated robot so as to avoid positions where the safety stop has occurred frequently.

According to the aforementioned aspects, it is possible to shorten time required for re-teaching an articulated robot so that it can avoid positions where safety stop has occurred frequently.

The invention claimed is:

1. A control unit for an articulated robot operating in an area where a human can exist comprising:
   a memory unit which accumulates, from at least one sensor, when a safety stop function operates by a contact or a proximity between the articulated robot in operation and at least one of the human and an object, information of occurrence positions in each of which the contact or the proximity occurs or information detected by the at least one sensor which can be used to derive the occurrence positions, wherein the contact and the proximity are causes of the operation of the safety stop function; and
   a controller which makes a display device display a plurality of spheres, whose centers are the occurrence positions, respectively, on a predetermined display based on the information of the occurrence positions or the information detected by the at least one sensor and accumulated by the memory unit, and display on the predetermined display overlapping regions of the plurality of spheres by assigning a color thereto, wherein the color is different from one which is assigned to a region where the spheres are not overlapping with each other.

2. The control unit for the articulated robot according to claim 1, wherein
   the controller is configured so that a space where the spheres exist without overlapping with other of the spheres is set to be a region of Score 1, a space where two of the spheres are overlapping with each other is set to be a region of Score 2, and a space where three of the spheres are overlapping with each other is set to be a region of Score 3; and
   the display device is configured to set a region as an avoidance area of a corresponding score value out of the Score 1, Score 2 and Score 3, the corresponding score corresponds to the score value received as input, and displays the avoidance area on the predetermined display.

* * * * *